(12) United States Patent
Yakishyn (10) Patent No.: US 9,747,002 B2
(45) Date of Patent: Aug. 29, 2017

(54) DISPLAY APPARATUS AND IMAGE REPRESENTATION METHOD USING THE SAME

(75) Inventor: Yevgen Yakishyn, Kyiv (UA)

(73) Assignee: Samsung Electronics Co., Ltd (KR)

( * ) Notice: Subject to any disclaimer, the term of this patent is extended or adjusted under 35 U.S.C. 154(b) by 200 days.

(21) Appl. No.: 13/568,723

(22) Filed: Aug. 7, 2012

(65) Prior Publication Data

US 2013/0169555 A1 Jul. 4, 2013

(30) Foreign Application Priority Data

Dec. 28, 2011 (KR) .......................... 10-2011-0144125

(51) Int. Cl.
*G06F 3/041* (2006.01)
*G06F 3/0483* (2013.01)
*G06F 3/0488* (2013.01)

(52) U.S. Cl.
CPC ............ *G06F 3/0483* (2013.01); *G06F 3/041* (2013.01); *G06F 3/04883* (2013.01)

(58) Field of Classification Search
CPC ....................................................... G06F 3/041
See application file for complete search history.

(56) References Cited

U.S. PATENT DOCUMENTS

| 6,041,323 | A | * | 3/2000 | Kubota | ............. | G06F 17/30678 |
| 7,487,469 | B2 | | 2/2009 | Toriyama et al. | | |
| 2003/0156145 | A1 | * | 8/2003 | Hullender | ........... | G06F 3/04883 |
| | | | | | | 715/863 |
| 2007/0083828 | A1 | | 4/2007 | Toriyama et al. | | |
| 2007/0126716 | A1 | * | 6/2007 | Haverly | ................ | G06F 3/0346 |
| | | | | | | 345/179 |
| 2009/0267909 | A1 | * | 10/2009 | Chen | .................... | G06F 3/04883 |
| | | | | | | 345/173 |
| 2009/0273571 | A1 | | 11/2009 | Bowens | | |
| 2010/0097322 | A1 | * | 4/2010 | Hu | ....................... | G06F 3/04883 |
| | | | | | | 345/173 |
| 2010/0097337 | A1 | * | 4/2010 | Lin | ...................... | G06F 3/04883 |
| | | | | | | 345/173 |
| 2010/0175018 | A1 | | 7/2010 | Petschnigg et al. | | |
| 2010/0192108 | A1 | | 7/2010 | Liu et al. | | |
| 2010/0229090 | A1 | | 9/2010 | Newton et al. | | |
| 2011/0041102 | A1 | | 2/2011 | Kim | | |
| 2011/0083089 | A1 | | 4/2011 | Pahud et al. | | |
| 2011/0164029 | A1 | * | 7/2011 | King | ................... | G06F 3/04883 |
| | | | | | | 345/419 |
| 2011/0205170 | A1 | | 8/2011 | Chang | | |

FOREIGN PATENT DOCUMENTS

| JP | 2006350669 | 12/2006 |
| KR | 1020040094954 | 11/2004 |
| KR | 1020110030106 | 3/2011 |

* cited by examiner

*Primary Examiner* — Jennifer Mehmood
*Assistant Examiner* — Carl Adams
(74) *Attorney, Agent, or Firm* — The Farrell Law Firm, P.C.

(57) ABSTRACT

A display apparatus includes a display unit which displays a content on a screen, a recognition unit which, when a user touch is input on the screen, recognizes an object corresponding to a touch trajectory, and a controller which controls the display unit to change a page of the content displayed on the screen according to the object. Accordingly, it is possible to change the page of the electronic content swiftly and manipulate the electronic apparatus easily, and user convenience is improved by providing an intuitive user experience of an interface.

12 Claims, 11 Drawing Sheets

Next page

(2)

Previous page

FIG. 6

TOPIC D
PAGE 345

DISPLAY APPARATUS AND IMAGE REPRESENTATION METHOD USING THE SAME

PRIORITY

This application claims priority under 35 U.S.C. §119 to Korean Patent Application No. 10-2011-0144125, which was filed on Dec. 28, 2011, in the Korean Intellectual Property Office, the entire disclosure of which is incorporated herein by reference.

BACKGROUND OF THE INVENTION

1. Field of the Invention

The present invention relates generally to a display apparatus and an image representation method using the same, and more particularly, to a display apparatus which receives and processes touch input of a user, thereby outputting a resulting image, and an image representation method using the same.

2. Description of the Related Art

Smart phones and tablet PCs are regarded as the latest innovation of human civilization and as the most advanced digital apparatuses. At the core of this innovation is the touch screen apparatus, which advances a new paradigm for implementing a user-centric interface through analogue sensitivity.

The touch screen apparatus is designed to recognize a touch input position when a person's hand or an object that touches a character or any position appearing on a screen, and performs a specific process in response, using stored software. The touch screen apparatus utilizes a graphic-based window system, commonly used in the past, and incorporates input and output apparatuses into a single apparatus, thereby maximizing user convenience.

Touch inputs through a touch screen apparatus are categorized as basic data input or command input. The basic data input refers to received input of data in a format comprehensible only by a person and simply storing the received data. For example, the touch screen apparatus may receive input of text data or graphic data and store the receive data. The command input refers to the touch screen apparatus interpreting and processing received input and outputting accordingly, for example a resulting image. The command input may also, for example, be a command for executing a program by flicking a specific icon or moving an icon to a certain position by dragging.

However, the command input is limited to performing only a simple command. For a more complicated command, the user is required to input several flicking or dragging inputs to obtain a desirable result. Alternatively, the touch screen apparatus can input a complicated command by displaying a keyboard screen on a screen of the touch screen apparatus. However, using a keyboard screen for command input is inconvenient.

Thus, there is a need for a simple input-output apparatus providing a user experience-based simple interface so that the user can use complicated functions of the apparatus with ease.

SUMMARY OF THE INVENTION

Accordingly, the present invention has been made to solve the above-mentioned problems and disadvantages occurring in the prior art, and the present invention provides a display apparatus that is driven according to an object corresponding to touch input of a user when the user touches a screen, and displays a resulting image on the screen. Accordingly, it is possible to change the page of the electronic content swiftly and manipulate the electronic apparatus easily, and user convenience is improved by providing an intuitive user interface.

According to an aspect of the present invention, there is provided a display apparatus, including a display unit which displays a content on a screen, a recognition unit which, when a user touch is input on the screen, recognizes an object corresponding to a touch trajectory, and a controller which controls the display unit to change a page of the content displayed on the screen according to the recognized object.

According to an aspect of the present invention, there is provided an image representation method, including sensing user touch input on a screen, recognizing an object corresponding to a touch trajectory of the user, and changing a page of a content displayed on the screen according to the recognized object.

BRIEF DESCRIPTION OF THE DRAWINGS

The above and/or other features, aspects and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings, in which aspects of the present invention are illustrated. In the following description, same reference numerals are used for the same elements throughout the drawings. Well-known functions or elements may be omitted to avoid obscuring the description with unnecessary detail.

Figure 1:
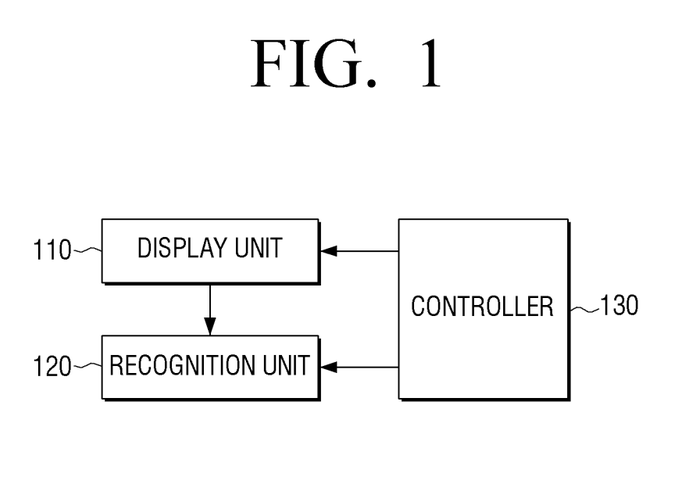
FIG. 1 is a block diagram illustrating a display apparatus, according to an embodiment of the present invention.

FIG. 1 is a block diagram illustrating a display apparatus 100 according to an embodiment of the present invention.

Referring to FIG. 1, the display apparatus 100 according to an embodiment includes a display unit 110, a recognition unit 120 that recognizes an object when there is a touch on a screen, and a controller 130 that controls the display unit 110 to change a page of a content according to the recognized object.

The display unit 110 displays content on the screen and may include a liquid crystal display panel to display an image and a backlight unit to supply light to the liquid crystal display panel. The display unit 110 is controlled by the controller 130, which is described in more detail below. The controller 130 may further include a display driving circuit and a signal processing circuit. That is, the controller 130 drives the backlight unit to supply light to the liquid crystal display panel and signal-processes an input content and applies an electrode to the liquid crystal display panel. As a result, the display unit 110 displays a page of the input content (for example, an electronic book (e-book)) on the screen.

The display unit 110 is implemented in the form of a touch pad or an inter-layered touch screen. The display unit 110 is used as not only an output apparatus but also a user interface.

The recognition unit 120 is a touch screen apparatus that recognizes an object when there is a touch on the screen.

Figure 2:
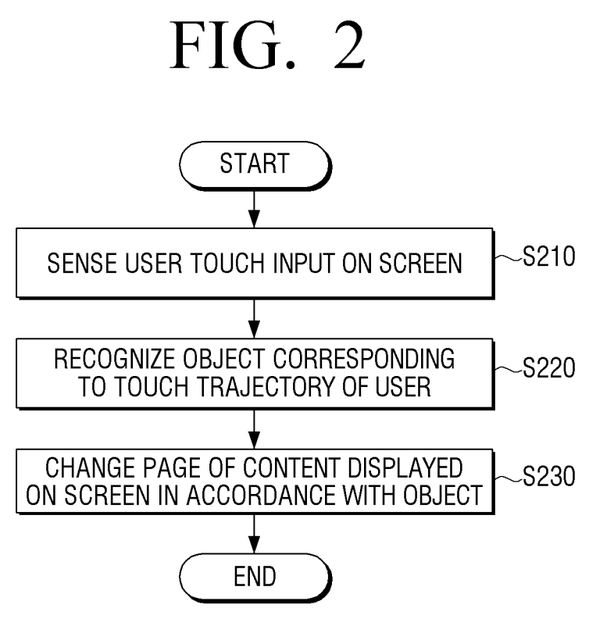
FIG. 2 is a flowchart illustrating a process of the display apparatus of FIG. 1 of recognizing an object corresponding to a touch trajectory of a user and changing a page of a content, according to an embodiment of the present invention.

FIG. 2 is a flowchart illustrating a process of the display apparatus 100 of FIG. 1 of recognizing an object corresponding to a touch trajectory of a user and changing a page of a content.

When a user performs input by touching the screen of the display apparatus 100, the recognition unit 120 recognizes an input object in Step 210. The touch may include various ways such as flicking and dragging, and the object includes a character including a letter, a symbol, and a figure, and an image. When the display unit 110 displays a page of content, the user may write a page number that the user wishes to go to by dragging on the screen. The recognition unit 120 analyzes a trajectory of the touch input by the user and recognizes a page number of the content corresponding to the object in Step 220, and the display unit 100 displays content corresponding to the page number on the screen in Step 230.

Figure 3:
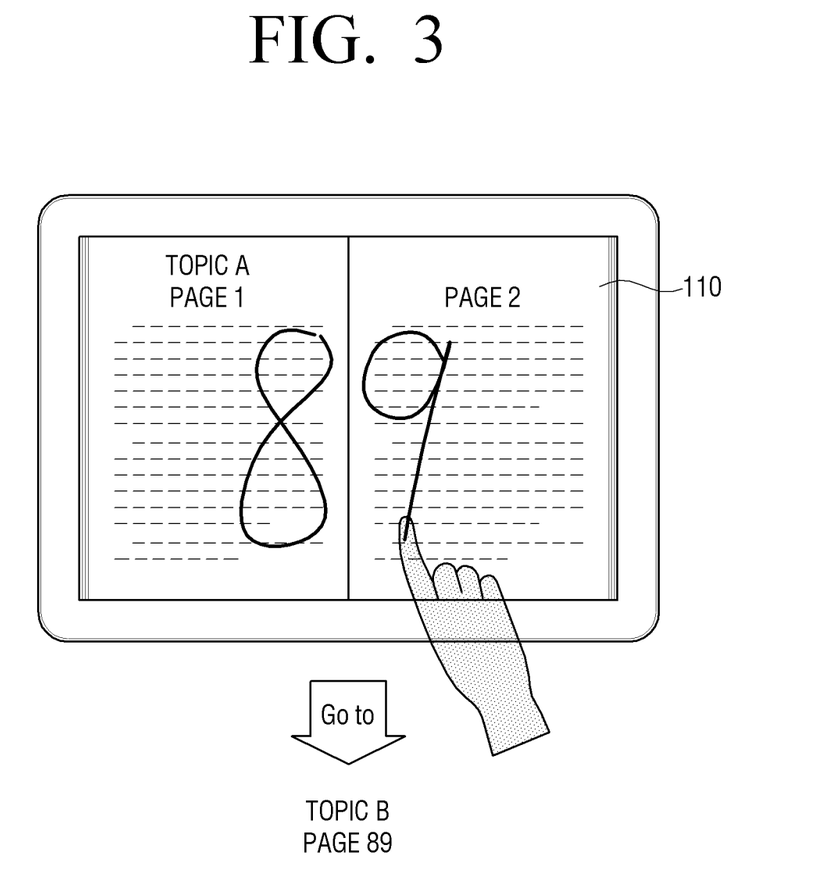
FIG. 3 is a diagram illustrating a case in which a user inputs an object figure "89" and a display unit goes to page 89 of the content, according to an embodiment of the present invention.

FIG. 3 is a diagram illustrating a case in which a user inputs an object figure "89" and a display unit 110 goes to page 89 of the content.

Referring to FIG. 3, when the content is an e-book and the user writes "89," which is the page of the e-book that the user wishes to read next, by a dragging input on the screen of the display apparatus 100, the display unit 110 displays page 89 of the e-book.

Pattern matching is used as a method of analyzing a trajectory of touch input and recognizing an object. The pattern matching method sets a unique pattern according to different types of objects, and, when an input object is consistent with an already set object pattern, the pattern matching method regards the objects as the same object and performs a corresponding process. For a relatively simple pattern such as a figure, the pattern setting method defines a coordinate characteristic in advance and checks whether a coordinate characteristic of an input object is consistent with the already existing coordinate characteristic. This method can easily recognize a relatively simple object such as a figure, but may not be accurate for other objects.

Another pattern matching method is sampling various scripts regarding the same object and matching all coordinate characteristics. This method increases accuracy but has a disadvantage of requiring complicated calculation and resources. In order to increase the accuracy of pattern matching, various heuristic methods such as limiting a size of an object by limiting an input area and a method for searching and suggesting several similar objects and guiding selection of the user is used. Additionally, various other object recognizing methods may also be used.

As illustrated in FIG. 3, when the user writes the figures "8" and "9" by touching and dragging on the screen, the recognition unit 120 determines coordinates of a trajectory of touch input by the user and determines a coordinate characteristic by distinguishing between a touched portion and a non-touched portion, thereby recognizing that the input object is "89." The controller 130 recognizes that the user wishes to go to page 89 of the content and controls the display apparatus 100.

The controller 130 controls an overall operation of the display apparatus 100, and in particular, when the recognition unit 120 recognizes an object input by touching on the screen, the controller 130 controls the display unit 110 to change a page of the content according to the recognized object in Step 230 of FIG. 2. That is, the controller 130 signal-processes new content data, inputs the new content data to the liquid crystal display panel, supplies light to the liquid crystal display panel by driving the backlight unit, and displays a changed page of the content through the display unit 110.

When the object recognized by the recognition unit 120 is a figure, the controller 130 may control the display unit 110 to change the page to a page corresponding to the figure and displays the page. When the object is a letter, the controller 130 may control the display unit 110 to change the page to a page including a paragraph corresponding to the letter and display the page. When the object is a symbol, the controller 130 may control the display unit 110 to change the page to a previous page (for example, a symbol "−") or a next page (for example, a symbol "+") and display the page.

FIG. 3 illustrates the case in which the display unit 110 is controlled to display page 89 of the e-book when the object is the figure "89."

Figure 4:
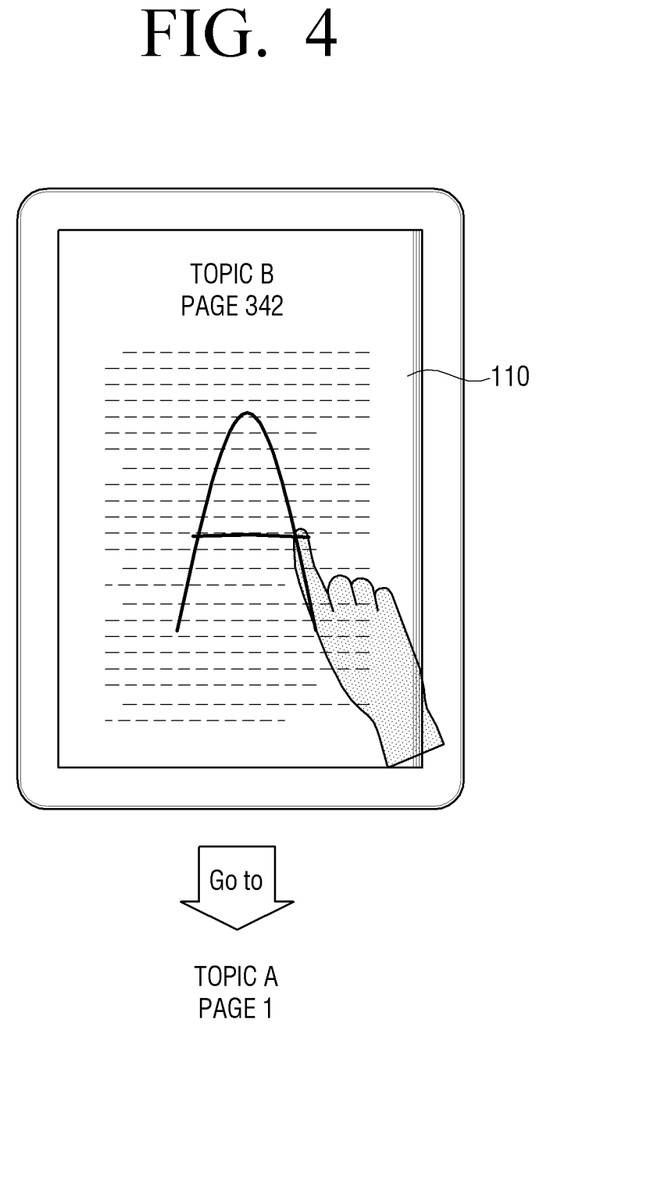
FIG. 4 is a diagram illustrating change of a page when an object is a letter, according to an embodiment of the present invention.
Figure 5:
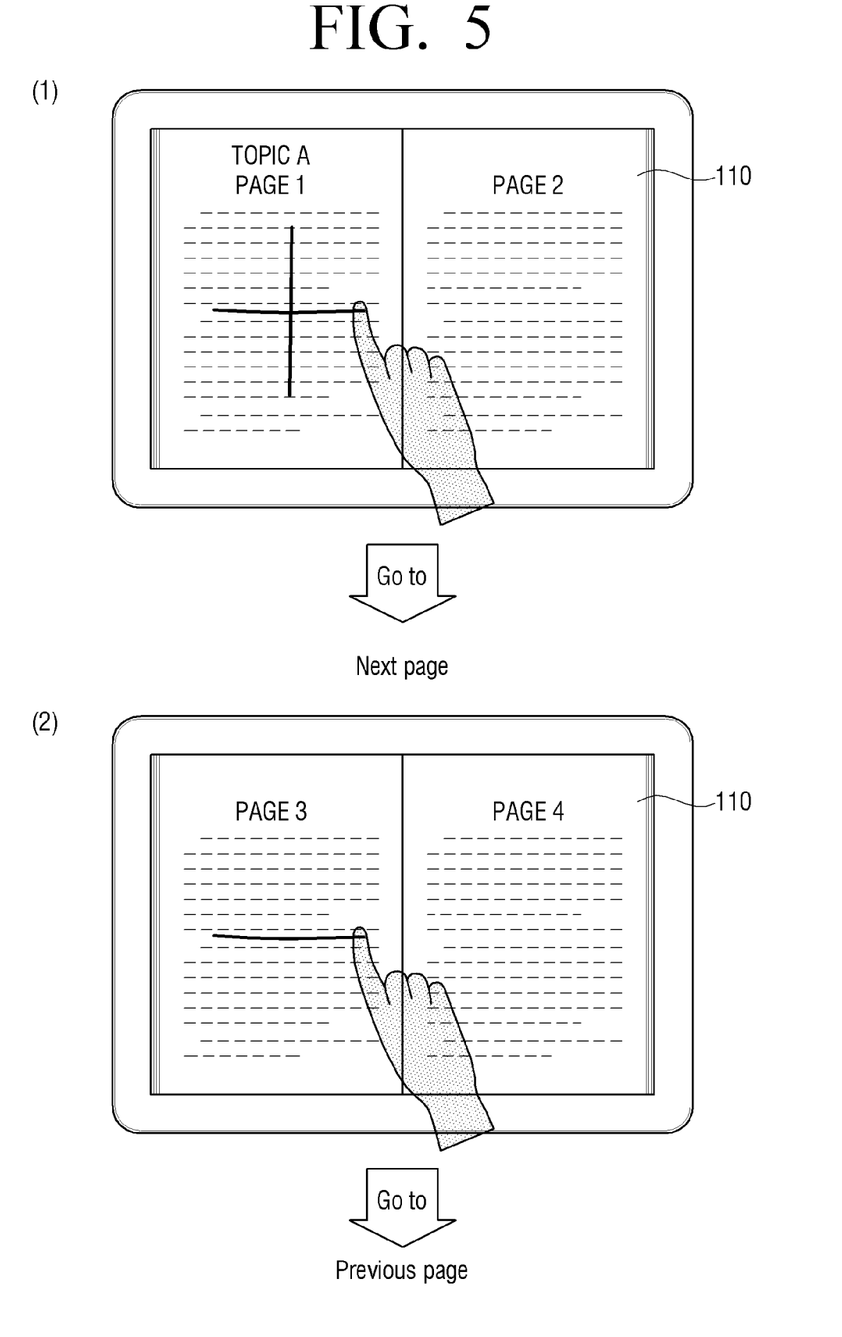
FIG. 5 is a diagram illustrating change of a page when an object is a symbol, according to an embodiment of the present invention.

FIG. 4 is a diagram illustrating change of a page when an object is a letter, and FIG. 5 is a diagram illustrating change of a page when an object is a symbol. Specifically, FIG. 4 illustrates the case in which the display unit 110 is controlled to display a page including a paragraph corresponding to "TOPIC A" of the e-book when the object is the letter "A." (1) of FIG. 5 illustrates the case in which the display unit 110 is controlled to display a next page of the e-book when the object input by the user is the symbol "+," and (2) of FIG.

5 illustrates the case in which the display unit 110 is controlled to display a previous page of the e-book when the object is the symbol "−."

Figure 6:
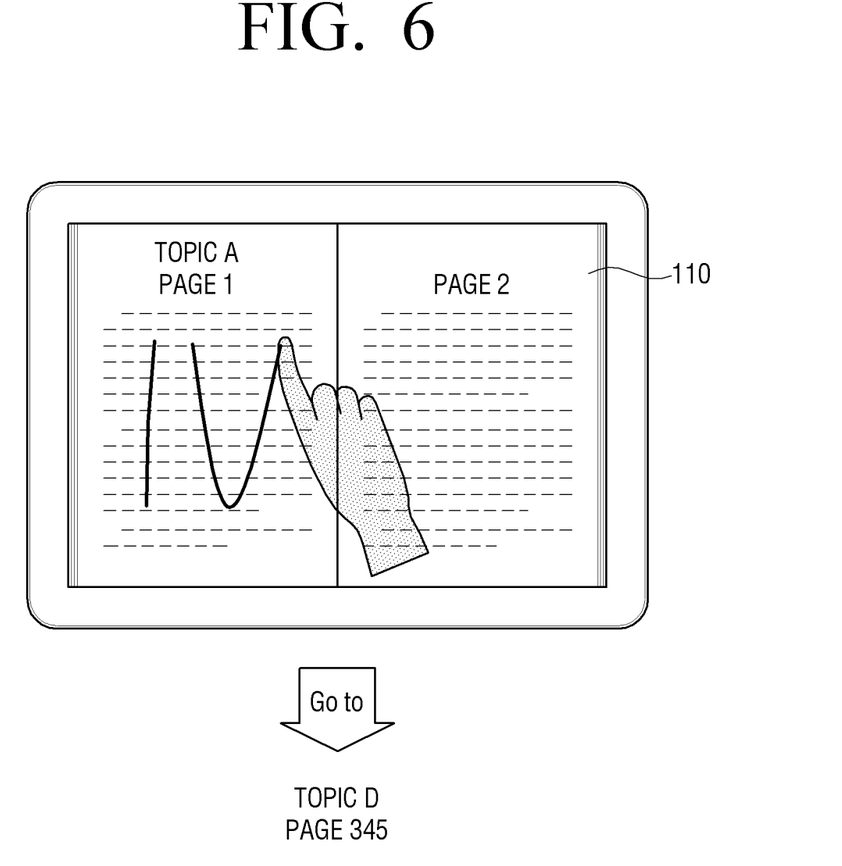
FIG. 6 is a diagram illustrating a case in which, when an object is a plurality of Roman numerals "IV," "IV" is recognized by combining the objects "I" and "V," and the display unit displays a corresponding page of an e-book, according to an embodiment of the present invention.

FIG. 6 illustrates a case in which, when an object is a plurality of Roman numerals "IV," "IV" is recognized by combining the objects "I" and "V," and the display unit 110 displays a corresponding page of the e-book.

Specifically, referring to FIG. 6, when a plurality of objects are recognized by the recognition unit 120, the controller 130 of the display apparatus 100 according to an embodiment combines the plurality of objects and controls the display unit 110 to change the page to a page corresponding to the combined objects. The plurality of objects is determined by determining whether there is an overlapping area in the input object or not. For example, as illustrated in FIG. 4, the English alphabet "A" has overlapping lines to form the letter and thus is recognized as a single object.

However, as illustrated in FIG. 3, a curve forming each of the figures "8" and "9" has an independently connected form and thus each of the figures is recognized as a single object. Also, since there is no overlapping area between the figures "8" and "9," the figures "8" and "9" are recognized as separate objects. The controller 130 combines the figures "8" and "9" in consideration of locations of the figures "8" and "9" recognized by the recognition unit 120 and controls the display unit 110 to display page 89 of the e-book corresponding to the combined figure "89" on the display unit 110. Similarly, as illustrated in FIG. 6, the recognition unit 120 recognizes the Roman numerals "I" and "V," which are two objects, and the controller 130 combines the two objects and displays a page corresponding to the combined Roman numeral "IV" on the display unit 110. However, when the Roman numerals "I" and "V" are input in a connected form unlike the embodiment of FIG. 6, the Roman numeral "IV" is recognized directly without going through the above-described process.

Figure 7:
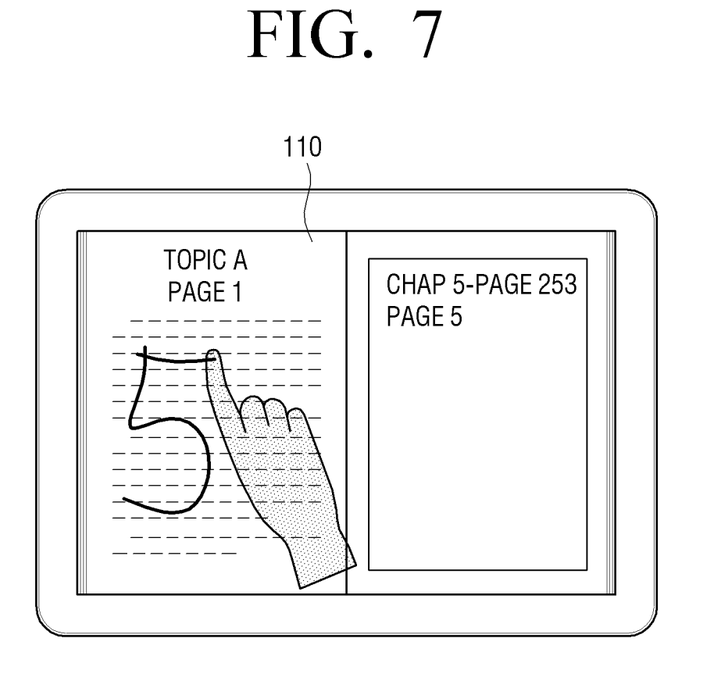
FIG. 7 is a diagram illustrating a case in which the display unit displays a list of pages when a plurality of pages correspond to an object figure "5," according to an embodiment of the present invention.

FIG. 7 is a diagram illustrating a case in which the display unit 110 displays a list of pages when a plurality of pages correspond to an object figure "5."

Referring to FIG. 7, when a plurality of pages correspond to an object recognized by the recognition unit 120, the controller 130 of the display apparatus 100 according to an embodiment may control the display unit 110 to display a list of the plurality of pages and change the page to a page that is selected from among the plurality of pages. When the user inputs the figure "5" by dragging on the screen, pages "CHAP 5" and "PAGE 5" of the e-book correspond to the figure "5" and thus the display unit 110 may display a list of the pages. The user may select a page item from the displayed list by a flicking input and the controller 130 controls the display unit 110 to display contents of the selected page on the display unit 110.

Figure 8:
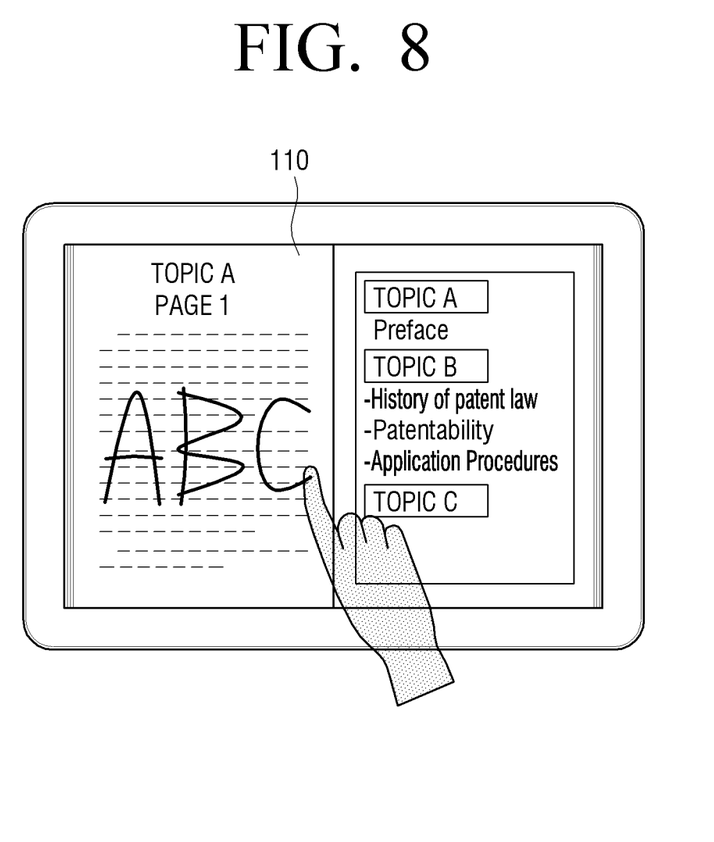
FIG. 8 is a diagram illustrating a case in which, when a plurality of objects "A," "B," and "C" are input, a list of pages of contents corresponding to the plurality of objects, is displayed, according to an embodiment of the present invention.

FIG. 8 is a diagram illustrating a case in which, when a plurality of objects "A," "B," and "C" are input, a list of pages of contents corresponding to the plurality of objects, is displayed.

Specifically, referring to FIG. 8, when a plurality of objects are recognized by the recognition unit 120, the controller 130 of the display apparatus 100 according to an embodiment may control the display unit 110 to display a list of pages of contents corresponding to the plurality of objects, and change the page to a page that is selected from among the plurality of pages. As illustrated in FIG. 8, when the user inputs the English alphabets "A," "B," and "C" on the screen (since there is no overlapping area among the letters "A," "B," and "C" as described above, they are recognized as separate objects), pages "TOPIC A," "TOPIC B," and "TOPIC C" of the e-book correspond to the letters "A," "B," and "C," respectively. Therefore, the display unit 110 displays a list containing these pages. The user may select a page item from the displayed page list by flicking and the controller 130 may control the display unit 110 to display contents of the selected page on the display unit 110.

Figure 9:
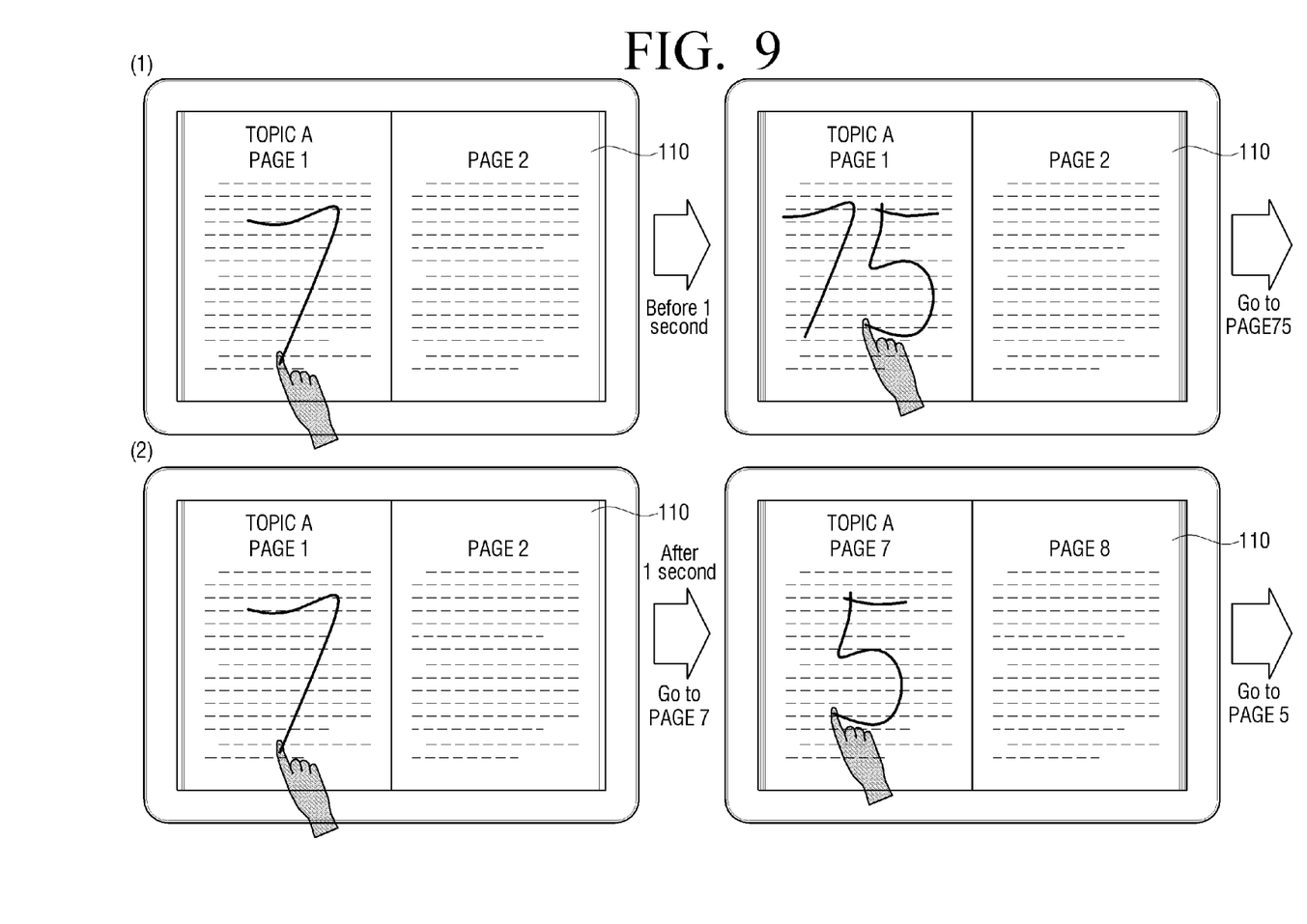
FIG. 9 is a diagram illustrating different processes performed by the controller 130 according to a delay time, after one object is input, until another object is input, according to an embodiment of the present invention.

FIG. 9 is a diagram illustrating different processes performed by the controller 130 according to a delay in time, after one object is input, until another object is input.

Specifically, referring to FIG. 9, when one object is recognized and then another object is recognized within a predetermined time, the controller 130 of the display apparatus 100 recognizes a plurality of objects. Several objects may be input in sequence when the user wishes to change the content page continuously. Similarly, a plurality of objects may be input and thus the two cases need to be distinguished.

Accordingly, when one object is recognized and then another object is recognized within a predetermined time (for example, 1 second), the controller 130 recognizes input of a plurality of objects. The controller 130 instructs the display unit 110 to combine the plurality of objects and change the page or controls the display unit 110 to display a list of pages of content corresponding to the plurality of objects, respectively.

Alternatively, when one object is recognized and then another object is recognized after a predetermined time, the objects may also be recognized as a continuous input of objects having separate purposes and the page is changed to pages corresponding to the objects in sequence.

As illustrated in (1) of FIG. 9, when the user inputs the figure "7" and then inputs the figure "5" before a predetermined time (one second) elapses, the two objects are combined and page 75 is displayed on the display unit 110. Alternatively, as illustrated in (2) of FIG. 9, when the user inputs the figure "7" and then inputs the figure "5" after the predetermined time elapses, the controller 130 determines the objects as continuous input of objects having different purposes. Therefore, the controller 130 goes to page 7 of the e-book first and then goes to page 5 of the e-book, and finally displays page 5 of the e-book on the display unit 110.

Figure 10:
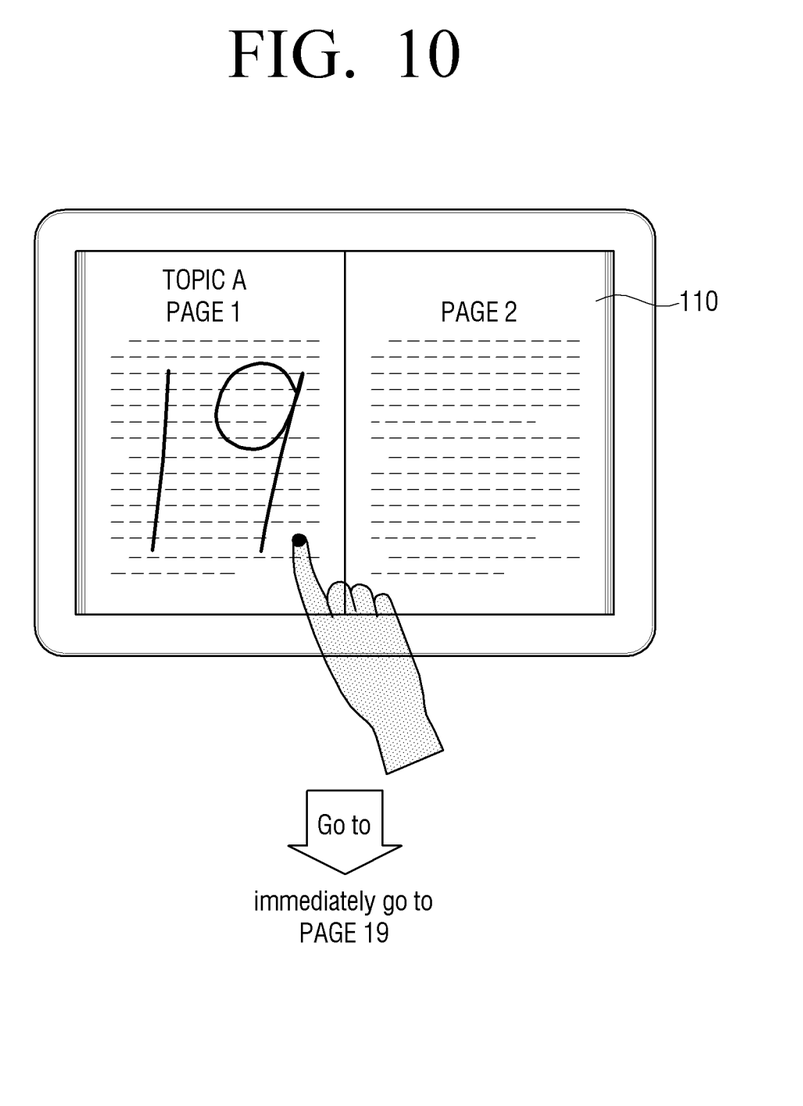
FIG. 10 is a diagram illustrating end of input of an object by displaying "." after inputting the object, according to an embodiment of the present invention.

FIG. 10 is a diagram illustrating end of input of an object by displaying "." after inputting the object.

Specifically, referring to FIG. 10, when an object recognized by the recognition unit 120 is an end symbol, the controller 130 of the display apparatus 100 according to an embodiment ends recognition of the object and controls the display unit 110 to change the page of the content displayed on the screen according to the object recognized. That is, the user may inform that object input ends by putting a period "." after inputting the figures "1" and "9" continuously as illustrated in FIG. 10.

The recognition unit 120 recognizes the input and the controller 130 stops waiting for input of an object, and controls the display unit 110 to combine the plurality of input objects and display page 19 of the e-book or to display a list of pages of the e-book corresponding to the figures "1" and "9," on the screen. The user ends the entire input by putting the period so that, when the number of input objects is distinguished according to a time difference, to avoid having to input an object within a predetermined time, and prevent changing to an unintended page caused by a delay in continuous input.

Figure 11:
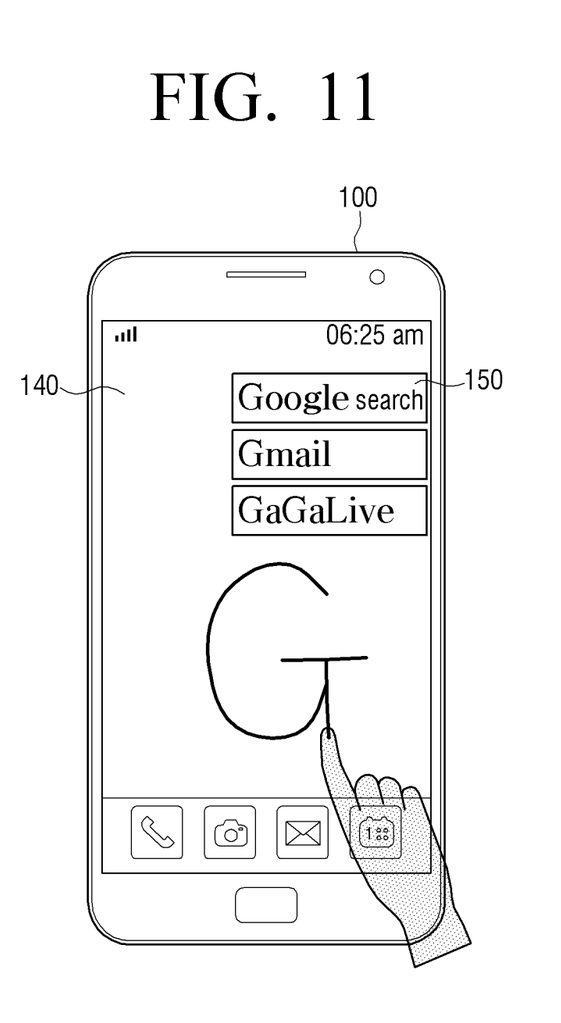
FIG. 11 is a diagram illustrating touch input to execute a function of a touch screen apparatus, according to an embodiment of the present invention.

FIG. 11 is a diagram illustrating touch input to execute a function of a touch screen apparatus according to an embodiment of the present invention.

Alternatively, the function of the touch screen apparatus may be executed in ways other than changing the page of the content. That is, when the user inputs an object by touching on the screen, the function of the touch screen apparatus corresponding to the input object is performed. Since an electronic apparatus including a touch screen such as a smart phone includes several complicated functions, setting a system such as setting a screen, Bluetooth®, or Wi-Fi may require the user to go through a complicated process of selecting many menus or to execute several applications installed in the apparatus.

However, by using the above-described method, the user directly controls settings of the electronic apparatus or easily executes an installed application by inputting an object through the touch screen apparatus. For example, in a smart phone, an application that is frequently used by the user is displayed on a wallpaper background image along with its icon, but an application that is infrequently used by the user appears only on a separate window in which icons of all of the applications are collected. The user often searches all of the applications to execute a certain application and thus may find it difficult to use the smart phone due to the complicated searching process.

Alternatively, the user of the smart phone may write an initial of an application that the user wishes to execute on the screen. Specifically, when the user wishes to search using the Google® search engine and inputs "G" on the screen 140 as illustrated in FIG. 11, the controller 130 controls the display unit 110 to display a list of applications 150 staring with "G" on the screen. The user selects the application "GOOGLE SEARCH" and executes it instantly.

Accordingly, as described above, it is possible to change the page of the electronic content swiftly and manipulate the electronic apparatus easily, and user convenience is improved by providing an intuitive user experience of the interface.

While the present invention has been shown and described with reference to various embodiments thereof, various changes in form and detail may be made without departing from the scope and spirit of the present invention, defined by the appended claims and their equivalents.

What is claimed is:

1. A display apparatus comprising:
   a display unit which displays a first page of content on a screen, the first page of content being displayed before a user touch for changing page is input;
   a recognition unit which, when a user touch is input on the first page displayed on the screen, recognizes a written object written by the user touch; and
   a controller which controls the display unit to change from the first page to at least one second page of content determined by the recognized written object, the second page of content being displayed after the user touch for changing page is input, and being different than the first page of content,
   wherein, when one written object is recognized and then another written object is recognized within a predetermined time, the controller combines the written objects, and controls the display unit to change from the first page of content to the second page of content corresponding to the combined written objects,
   wherein, when the written object recognized by the recognition unit is a letter, the controller controls the display unit to change from the first page to the second page including a paragraph corresponding to the letter and to display the second page,
   wherein, when the written object recognized by the recognition unit is a page number, the controller controls the display unit to change from the first page of content to the second page corresponding to the page number and to display the second page, and
   wherein an area on the screen where the user touch for changing page is input is identical to the area on the screen where the first page of content is displayed.

2. The display apparatus as claimed in claim 1, wherein, when a plurality of second pages correspond to the recognized written object, the controller displays a list of the plurality of second pages and controls the display unit to change from the first page of content to a second page that is selected from the list of the plurality of second pages.

3. The display apparatus as claimed in claim 1, wherein, when the written object recognized by the recognition unit is a symbol, the controller controls the display unit to change from the first page to the second page that is adjacent to the first page, according to the symbol, and to display the second page.

4. The display apparatus as claimed in claim 1, wherein, when a plurality of written objects are recognized by the recognition unit, the controller combines the plurality of written objects and controls the display unit to change from the first page to the second page corresponding to the combined written objects.

5. The display apparatus as claimed in claim 1, wherein, when a plurality of written objects are recognized by the recognition unit, the controller displays a list of second pages corresponding to the plurality of written objects, and controls the display unit to change from the first page to the second page that is selected from the list of second pages.

6. The display apparatus as claimed in claim 1, wherein, when the written object recognized by the recognition unit is an end symbol, the controller ends object recognition and controls the display unit to change the first page displayed on the screen according to the recognized written object.

7. An image representation method comprising:
   sensing a user touch input on a first page of content displayed on a screen, the first page of content being displayed before a user touch for changing page is input;
   recognizing a written object written by the user touch; and
   changing from the first page displayed on the screen to at least one second page of content determined by the recognized written object, the second page of content being displayed after the user touch for changing page is input, and being different than the first page of content,
   wherein changing from the first page comprises combining, when one written object recognized and then another written object is recognized with a predetermined time, the written objects, and changing from the first page of content to the second page of content corresponding to the combined written objects,
   wherein changing from the first page comprises, when the recognized object is a letter, changing from the first page to the second page including a paragraph corresponding to the letter,
   wherein changing from the first page comprises, when the recognized written object is a page number, changing from the first page to the second page corresponding to the page number, and
   wherein an area on the screen where the user touch for changing page is input is identical to the area where the first page of content is displayed.

8. The image representation method as claimed in claim 7, wherein changing from the first page comprises, when the recognized written object is a symbol, changing from the first page to the second page that is adjacent to the first page, according to the symbol.

9. The image representation method as claimed in claim 7, wherein changing from the first page comprises, when a plurality of written objects are recognized, combining the plurality of written objects and changing from the first page to the second page corresponding to the combined plurality of written objects.

10. The image representation method as claimed in claim 7, wherein changing from the first page comprises, when a plurality of written objects are recognized, displaying a list of second pages of the content corresponding to the plurality of written objects, and changing from the first page to the second page that is selected from the list of second pages.

11. The image representation method as claimed in claim 7, wherein changing from the first page comprises, when the recognized written object is an end symbol, ending object recognition and changing the first page of content displayed on the screen according to the recognized written object.

12. The image representation method as claimed in claim 7, wherein changing from the first page further comprises:
   displaying, when a plurality of second pages correspond to the recognized written object, a list of the plurality of second pages; and
   changing from the first page of content to the second page of content that is selected from the list of the plurality of second pages.

* * * * *